US012670579B2

(12) United States Patent
Marciano et al.

(10) Patent No.: US 12,670,579 B2
(45) Date of Patent: Jun. 30, 2026

(54) DETECTION OF PROHIBITED OBJECTS CONCEALED IN AN ITEM, USING IMAGE PROCESSING

(71) Applicant: Seetrue Screening Ltd, Tel Aviv (IL)

(72) Inventors: Abraham Marciano, Jerusalem (IL); Amir Moredechai Lidor, Binyamina (IL); Shani Samoelov, Herzliya (IL); Assaf Frenkel, Ramat Hasharon (IL)

(73) Assignee: SEETRUE SCREENING LTD, Tel Aviv (IL)

( * ) Notice: Subject to any disclaimer, the term of this patent is extended or adjusted under 35 U.S.C. 154(b) by 570 days.

(21) Appl. No.: 17/991,114

(22) Filed: Nov. 21, 2022

(65) Prior Publication Data

US 2023/0186456 A1      Jun. 15, 2023

(30) Foreign Application Priority Data

Nov. 21, 2021      (IL) .......................................... 288279

(51) Int. Cl.

| | |
|---|---|
| *G06V 20/52* | (2022.01) |
| *G06T 7/00* | (2017.01) |
| *G06T 7/70* | (2017.01) |
| *G06V 10/26* | (2022.01) |
| *G06V 10/74* | (2022.01) |
| *G06V 10/762* | (2022.01) |
| *G06V 10/82* | (2022.01) |

(52) U.S. Cl.
CPC .............. *G06T 7/0008* (2013.01); *G06T 7/70* (2017.01); *G06V 10/26* (2022.01); *G06V 10/82* (2022.01); *G06T 2207/30112* (2013.01); *G06V 2201/07* (2022.01)

(58) Field of Classification Search
CPC ..................... G06T 7/0008; G06T 7/70; G06T 2207/30112; G06V 10/26; G06V 10/82; G06V 2201/07; G06V 20/52; G06V 10/74; G06V 10/751; G06V 10/762
See application file for complete search history.

(56) References Cited

U.S. PATENT DOCUMENTS

| | | | | |
|---|---|---|---|---|
| 2018/0300610 A1 * | 10/2018 | Pye | .......................... | G06N 3/045 |
| 2020/0394430 A1 * | 12/2020 | Ahmed | ..................... | G06N 3/08 |

FOREIGN PATENT DOCUMENTS

| | | | | | |
|---|---|---|---|---|---|
| CN | 109858614 B | * | 6/2021 | | |
| WO | WO-2010050952 A1 | * | 5/2010 | ........... | G01V 5/0008 |

* cited by examiner

*Primary Examiner* — Vu Lei
*Assistant Examiner* — Lei Zhao
(74) *Attorney, Agent, or Firm* — Whitestone Law, PLLC

(57) ABSTRACT

Some embodiments are directed to a system that includes a processor and memory circuitry (PMC) that is configured to: obtain an image of an item acquired by an acquisition device; perform a first detection using a first software module implementing at least one first deep neural network to detect at least one given area of the image including at least part of a given element of the item enabling concealment of a prohibited object; perform a second detection including using a second software module implementing at least one second neural network to detect whether the given area includes a prohibited object; and perform an action upon detection of a presence of a prohibited object in the image, wherein the detection is based at least on an output of the second detection.

20 Claims, 9 Drawing Sheets

$130_1$ $130_4$

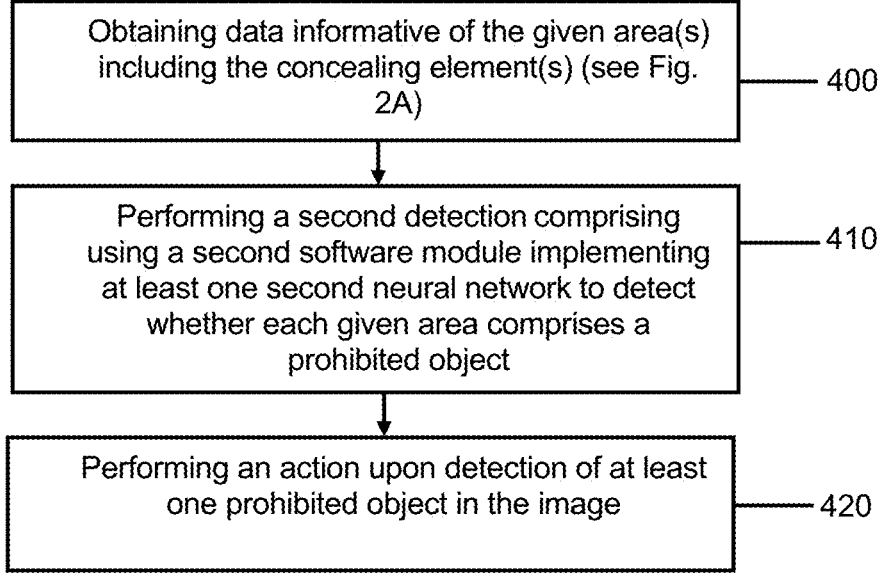

Obtaining data informative of the given area(s) including the concealing element(s) (see Fig. 2A) ——— 400

Performing a second detection comprising using a second software module implementing at least one second neural network to detect whether each given area comprises a prohibited object ——— 410

Performing an action upon detection of at least one prohibited object in the image ——— 420

FIG. 4A

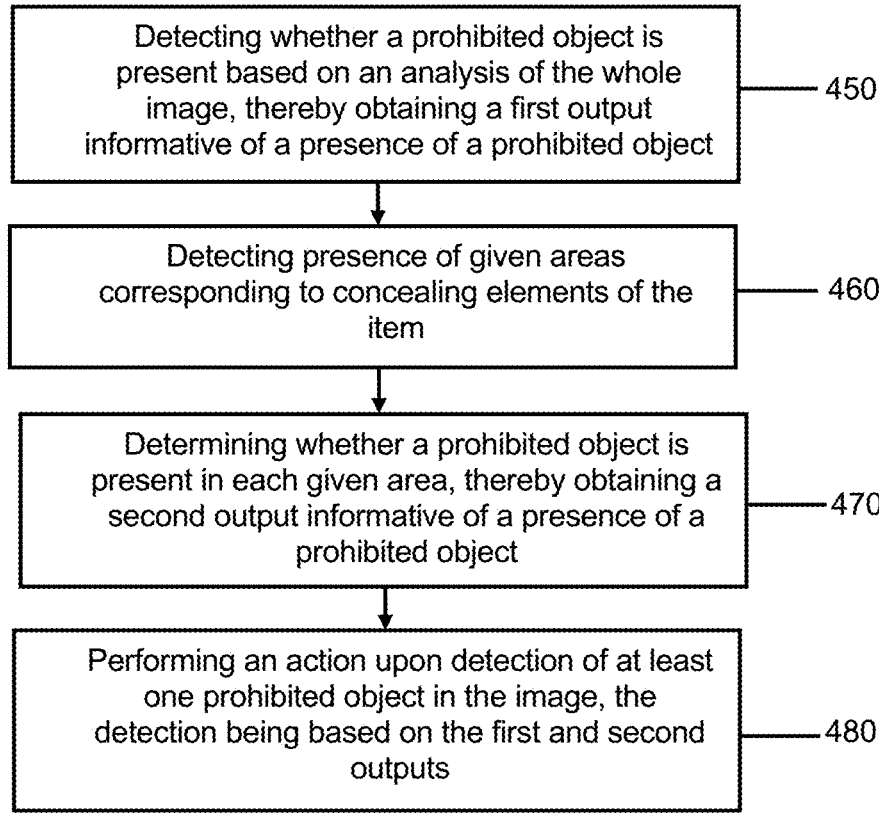

| Detecting whether a prohibited object is present based on an analysis of the whole image, thereby obtaining a first output informative of a presence of a prohibited object | — 450 |

| Detecting presence of given areas corresponding to concealing elements of the item | — 460 |

| Determining whether a prohibited object is present in each given area, thereby obtaining a second output informative of a presence of a prohibited object | —470 |

| Performing an action upon detection of at least one prohibited object in the image, the detection being based on the first and second outputs | —480 |

FIG. 4C

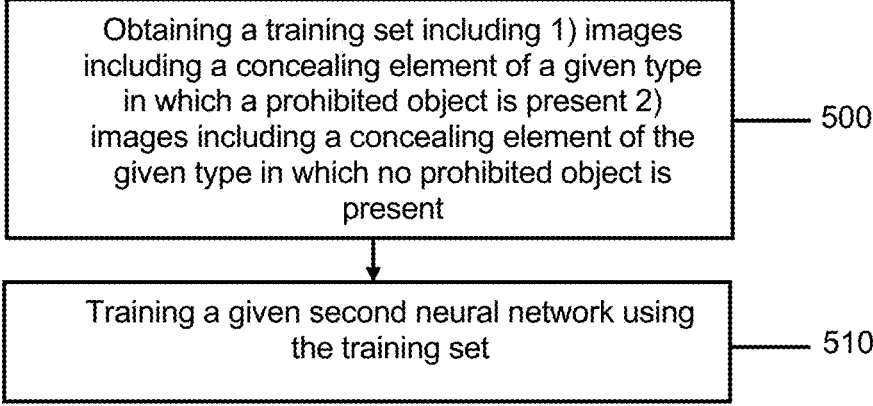

| Obtaining a training set including 1) images including a concealing element of a given type in which a prohibited object is present 2) images including a concealing element of the given type in which no prohibited object is present | — 500 |

| Training a given second neural network using the training set | — 510 |

Obtaining a training set with images including a concealing element of a given type in which no prohibited object is present — 600

Training a given second neural network using the training set — 610

DETECTION OF PROHIBITED OBJECTS CONCEALED IN AN ITEM, USING IMAGE PROCESSING

TECHNOLOGICAL FIELD

The invention is in the field of detection of prohibited objects concealed in an item, using image processing.

BACKGROUND

At a security checkpoint (for example in an airport), an acquisition device is used in order to acquire an image of an item carried by a person. The image can be verified by an operator and/or by a computerized system in order to detect the presence of a prohibited object (e.g. a weapon). Malicious persons use various techniques in order to prevent detection of the prohibited object in their items.

There is therefore a need to propose new systems and methods to automatically detect prohibited objects concealed in an item.

GENERAL DESCRIPTION

In accordance with certain aspects of the presently disclosed subject matter, there is provided a system comprising a processor and memory circuitry (PMC) configured to obtain an image of an item acquired by an acquisition device, perform a first detection using a first software module implementing at least one first deep neural network, to detect at least one given area of the image comprising at least part of a given element of the item enabling concealment of a prohibited object, perform a second detection comprising using a second software module implementing at least one second neural network to detect whether the given area comprises a prohibited object, and perform an action upon detection of a presence of a prohibited object in the image, wherein said detection is based at least on an output of said second detection.

In addition to the above features, the system according to this aspect of the presently disclosed subject matter can optionally comprise one or more of features (i) to (xii) below, in any technically possible combination or permutation:

i. performing the second detection comprises detecting in the given area a prohibited object which is fully or at least partially concealed using the given element;

ii. performing the action includes triggering an alert;

iii. performing the second detection only on a fraction of the image including the given area;

iv. performing the first detection comprises determining data informative of a type of the given element present in the given area;

v. the second software module implements a plurality of second neural networks, wherein, for at least a subset of the plurality of second neural networks, each given second neural network of the subset is trained to detect a prohibited object in an image comprising a different type of element enabling concealment of the prohibited object;

vi. the second software module implements a plurality of second neural networks including a second neural network trained to detect in an image a prohibited object fully or at least partially concealed using an element of a first type; another second neural network trained to detect in an image a prohibited object fully or at least partially concealed using an element of a second type, wherein the second type is different from the first type;

vii. each given second neural network is trained using a training set comprising: images in which a prohibited object is concealed using an element of an item, the element being of a type for which the second neural network is trained, and images in which no prohibited object is present;

viii. each given second neural network is trained using a training set comprising only images in which no prohibited object is present;

ix. the system is configured to determine data informative of a given type of the given element present in the given area, use the data to select a given second neural network among a plurality of different second neural networks implemented in the second software module, perform the second detection in a fraction of the image including the given area using the given second neural network;

x. for at least a subset of the plurality of second neural networks, each second neural network is trained to detect in an image presence of a prohibited object concealed using an element of a different type, and the system is configured to select the given second neural network which is trained to detect in an image presence of a prohibited object concealed using an element of said given type;

xi. the system is configured to use the given second neural network to detect in the given area a prohibited object which is fully or at least partially concealed using the given element; and xii. the system is configured to perform a detection in a majority of the image to detect whether a prohibited object is present in the image, thereby obtaining a first output informative of a presence of the prohibited object in the image, perform the first detection and the second detection, thereby obtaining a second output informative of a presence of a prohibited object in the image, perform an action upon detection of a presence of a prohibited object in the image, wherein said detection is based at least on the first output and the second output.

In accordance with certain aspects of the presently disclosed subject matter, there is provided a method comprising, by a processor and memory circuitry (PMC), obtaining an image of an item acquired by an acquisition device, performing a first detection using a first software module implementing at least one first deep neural network, to detect at least one given area of the image comprising at least part of a given element of the item enabling concealment of a prohibited object, performing a second detection comprising using a second software module implementing at least one second neural network to detect whether the given area comprises a prohibited object, and performing an action upon detection of a presence of a prohibited object in the image, wherein said detection is based at least on an output of said second detection.

In addition to the above features, the method according to this aspect of the presently disclosed subject matter can optionally implement one or more of features (i) to (xii) as described with reference to the system above.

In accordance with certain aspects of the presently disclosed subject matter, there is provided a non-transitory storage device readable by a machine, tangibly embodying a program of instructions executable by the machine to perform operations as described with reference to the method above.

According to some embodiments, the proposed solution improves accuracy of detection of prohibited objects in an image of an item. As a consequence, safety of persons and/or passengers is increased.

According to some embodiments, the proposed solution enables to detect prohibited objects which are concealed using concealing parts of an item which are typical in the scanned item (e.g. handle metallic tubes, combination lock, metallic reinforcement strips and/or sheets of a bag or a suitcase, etc.). Although conventional methods face difficulties in detecting prohibited objects which are concealed using concealing parts of an item (since the concealing parts tend to hide, at least partially, the prohibited objects in the image), the proposed solution improves detection of the prohibited objects under such harsh conditions.

According to some embodiments, the proposed solution can be used with various types of acquisition devices.

According to some embodiments, the proposed solution improves accuracy of detection of prohibited objects while being computationally efficient.

According to some embodiments, the proposed solution detects prohibited objects in real time or quasi real time.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 4A illustrates a flow chart of an embodiment of a method of detecting presence of a prohibited object in an area corresponding to a concealing element of an item;

FIG. 4C illustrates a flow chart of an embodiment of a method of detecting presence of a prohibited object in an image of an item;

FIG. 5A illustrates a flow chart of an embodiment of a method of training a neural network to detect a prohibited object in an image of a concealing element of an item;

DETAILED DESCRIPTION OF EMBODIMENTS

In the following detailed description, numerous specific details are set forth in order to provide a thorough understanding of the invention. However, it will be understood by those skilled in the art that the presently disclosed subject matter may be practiced without these specific details. In other instances, well-known methods have not been described in detail so as not to obscure the presently disclosed subject matter.

The term "processor and memory circuitry" (PMC) as disclosed herein should be broadly construed to include any kind of electronic device with data processing circuitry, which includes for example a computer processing device operatively connected to a computer memory (e.g. digital signal processor (DSP), a microcontroller, a field programmable gate array (FPGA), and an application specific integrated circuit (ASIC), a graphics processing unit (GPU), etc.) capable of executing various data processing operations.

It can encompass a single processor or multiple processors, which may be located in the same geographical zone, or may, at least partially, be located in different zones and may be able to communicate together.

Unless specifically stated otherwise, as apparent from the following discussions, it is appreciated that throughout the specification discussions utilizing terms such as "obtaining", "detecting", "raising", "determining", "training", "selecting", "performing" or the like, refer to the action(s) and/or process(es) of a processor and memory circuitry that manipulates and/or transforms data into other data, said data represented as physical, such as electronic, quantities and/or said data representing the physical objects.

In the specification, reference will be made to "prohibited objects". This includes (but is not limited to) e.g. weapons (guns, knives, grenades, etc.), explosives (e.g. explosives which include a metallic material, and/or shrapnel), etc. Although a typical example of a prohibited object is a threat object, this is however not limitative. The prohibited objects can include any object considered as prohibited at a control or security checkpoint (according to rules set e.g. by an administrator of the security checkpoint and/or by law) and should therefore be detected. For example, a prohibited object in a facility can include e.g. a USB drive, a cellular phone, etc.

Embodiments of the presently disclosed subject matter are not described with reference to any particular programming language. It will be appreciated that a variety of programming languages may be used to implement the teachings of the presently disclosed subject matter as described herein.

The invention contemplates a computer program being readable by a computer for executing one or more methods of the invention. The invention further contemplates a machine-readable memory tangibly embodying a program of instructions executable by the machine for executing one or more methods of the invention.

Figure 1A:
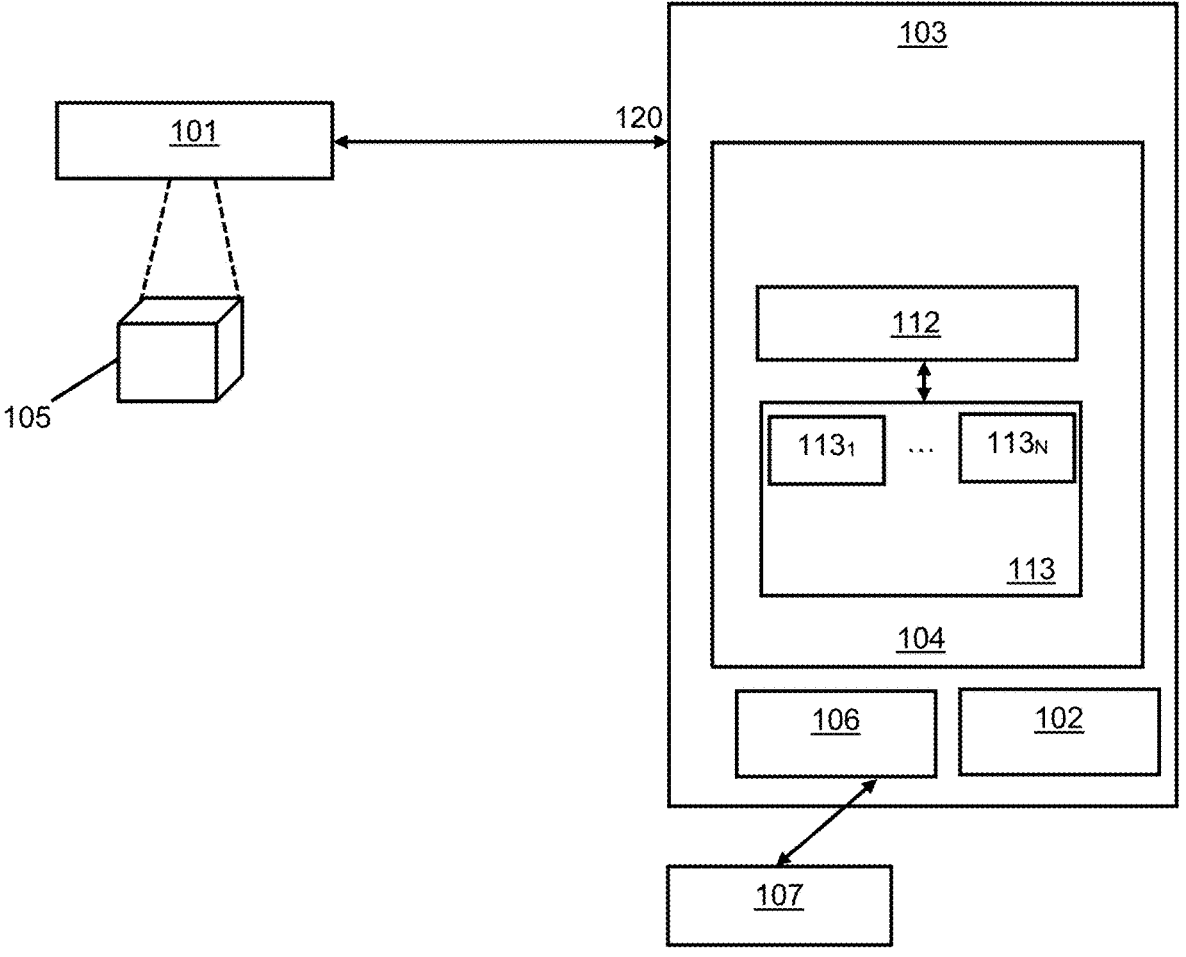
FIG. 1A illustrates an architecture of a system according to some embodiments of the invention.

Attention is drawn to FIG. 1A. FIG. 1A illustrates a system 100 which can be used at a control or security checkpoint, such as in an airport. This is however not limitative, and the system 100 can be used in various other applications.

FIG. 1A illustrates an acquisition device 101, which is operative to acquire an image of an item 105.

The acquisition device 101 includes for example an X-ray acquisition device, a scanner, a computerized tomography (CT) scan, or other types of acquisition devices (e.g. body scanner). This list is not limitative.

Item 105 includes for example, a container, a bag, a piece of cloth, a shoe, etc. These examples are not limitative.

The acquisition device 101 is operatively connected to a computer-implemented system 103. System 103 can be part of the acquisition device 101, or external to the acquisition device 101, or partially part of the acquisition device 101 and partially external to it. System 103 is operative to receive an image 120 of the item 105 (or data informative of the image 120) acquired by the acquisition device 101.

System 103 includes a processor and memory circuitry (PMC) 104. PMC 104 is configured to provide processing necessary for operating system 103, as further detailed in the various embodiments described hereinafter, and comprises a processor (not shown separately) and a memory (not shown separately). System 103 can be used to perform various methods described hereinafter, such as (but not limited to) the methods described with reference to FIGS. 2A, 3, 4A, 4B, 4C, 5A and 6.

In FIG. 1A, PMC 104 is operatively connected to a hardware-based input interface 102 and to a hardware-based output interface 106. The interface 102 (e.g. a keyboard) can be used e.g. by an operator to interact with system 103.

The processor of PMC 104 can be configured to execute several functional modules in accordance with computer-readable instructions implemented on a memory comprised in the PMC 104. Such functional modules are referred to hereinafter as included in the PMC 104.

A functional module comprised in PMC 104 includes a first software module 112. According to some embodiments, the first software module 112 includes a list of instructions (e.g. an executable code/executable program) stored in a memory.

The instructions can encode operation of a model, such as a machine learning network, and/or a sequence of computer vision instructions and/or image processing instructions, and/or a deep neural network, or other adapted models.

In particular, the instructions are such that, when executed by a PMC (such as PMC 104), they cause the PMC to provide, based on an image of an item received as an input (from e.g. the acquisition device 101), data informative of specific areas of the image. This will be discussed further in detail hereinafter.

According to some embodiments, and as mentioned above, the first software module 112 can implement a machine learning network. This includes for example a neural network, such as a deep neural network (DNN). A deep neural network (DNN) comprises layers organized in accordance with a respective DNN architecture. Optionally, at least some of the layers can be organized in a plurality of DNN sub-networks. Each layer of the ML network can include multiple basic computational elements (CE), typically referred to in the art as dimensions, neurons, or nodes.

Generally, computational elements of a given layer can be connected with CEs of a preceding layer and/or a subsequent layer. Each connection between a CE of a preceding layer and a CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g. the weighted sum of the inputs) and further derive an output by applying an activation function to the computed activation. The activation function can be, for example, an identity function, a deterministic function (e.g., linear, sigmoid, threshold, or the like), a stochastic function, or other suitable function. The output from the given CE can be transmitted to CEs of a subsequent layer via the respective connections. Likewise, as above, each connection at the output of a CE can be associated with a weighting value which can be applied to the output of the CE prior to being received as an input of a CE of a subsequent layer. Further to the weighting values, there can be threshold values (including limiting functions) associated with the connections and CEs.

The weighting and/or threshold values of the DNN can be initially selected prior to training, and can be further iteratively adjusted or modified during training to achieve an optimal set of weighting and/or threshold values in a trained ML network. After each iteration, a difference (also called loss function) can be determined between the actual output produced by ML network and the label or class associated with the respective training set of data. The difference can be referred to as an error value. Training can be determined to be complete when a cost or loss function indicative of the error value is less than a predetermined value, or when a limited change in performance between iterations is achieved. Optionally, at least some of the ML subnetworks (if any) can be trained separately, prior to training the entire ML network.

A set of ML network input data used to adjust the weights/thresholds of a deep neural network is referred to hereinafter as a training set.

According to some embodiments, the machine learning network of the first software module 112 is used to implement a segmentation algorithm (e.g. a semantic segmentation algorithm, such as, but not limited to, U-net, Mask-RCNN), and/or an object detection algorithm (such as, but not limited to, R-CNN, Region-Based Convolutional Neural Networks, Fast R-CNN, and YOLO (You Only Look Once), etc.).

Another functional module comprised in PMC 104 includes a second software module 113. According to some embodiments, the second software module 113 includes a list of instructions (e.g. an executable code/executable program) stored in a memory.

The instructions can encode operation of a model, such as a machine learning algorithm, and/or a sequence of computer vision instructions and/or image processing instructions, and/or a deep neural network, or other adapted models.

In particular, the instructions are such that, when executed by a PMC (such as PMC 104), they cause the PMC to provide, based on an image of an item received as an input (from e.g. the acquisition device 100) and data provided by the first software module 112, data informative of a presence of prohibited object(s) in the image. This will be discussed further in detail hereinafter.

According to some embodiments, and as mentioned above, the second software module 113 can implement at least one neural network (for example a deep neural network).

In some embodiments, the second software module 113 implements a plurality of distinct neural networks $113_1$ to $113_N$. As explained hereinafter, each neural network is trained using a different training set.

According to some embodiments, at least one neural network of the neural networks $113_1$ to $113_N$ is used to implement a segmentation algorithm (e.g. semantic segmentation algorithm, such as, but not limited to, U-net, Mask-RCNN), and/or an object detection algorithm (such as, but not limited to, R-CNN, Region-Based Convolutional Neural Networks, Fast R-CNN, and YOLO (You Only Look Once)), and/or an anomaly detection algorithm (such as, via an Auto-Encoder and/or a Generative Adversarial Network).

This is not limitative, and other adapted object detection algorithms/neural networks can be used.

According to some embodiments, the neural networks $113_1$ to $113_N$ can be organized according to a different architecture.

Although FIG. 1A depicts the first software module 112 and the second software module 113 as two different functional modules, in some embodiments, the first software module 112 and the second software module 113 can be implemented together in a same software module.

Upon processing the image 120, system 103 can send, via output interface 106, data informative of the output of the processing to a device 107 enabling a visual and/or audio representation of the processing. Device 107 includes e.g. a screen and/or a loudspeaker. In some embodiments, system 103 can trigger an alert and/or send instructions to another device to trigger an alert.

It is noted that at least part of system 103 illustrated in FIG. 1A can be implemented in a distributed computing environment, in which the aforementioned functional modules shown in FIG. 1A can be distributed over several local and/or remote devices and can be linked through a communication network.

Attention is now drawn to FIGS. 1B to 1E.

FIG. 1B to 1E depict non-limitative examples of images of items 105, which can be acquired by the acquisition device 101.

The item comprises one or more elements (concealing element) enabling concealment of a prohibited object in an image of the item (the prohibited object can be fully concealed, or at least partially concealed—in some embodiments, a majority of the prohibited object is concealed using the concealing element). In some embodiments, the item includes a plurality of prohibited objects, which can be of different types, and can be concealed in the item using different concealing elements of the item.

The concealing elements enable a user to hide (at least partially) the prohibited object in an image of the item. The concealing element acts as "mask" and renders detection of the prohibited object more difficult. The concealing element typically includes a metallic material, although this is not mandatory (e.g. thick organic substances, books and/or other materials). The material of the concealing element(s) attenuates the electromagnetic waves transmitted by the acquisition device 101 (e.g. X-rays), and therefore the prohibited object is less visible in the image than if it was not located above/underneath/within the concealing element. Note that in an X-ray image, there is no real difference between an object located "above" the concealing element, "within" the concealing element or "underneath" the concealing element, since in all cases the X-rays are attenuated by the concealing element before reaching the detector of the X-ray machine, thereby making the prohibited object less visible in the image.

Figure 1B:
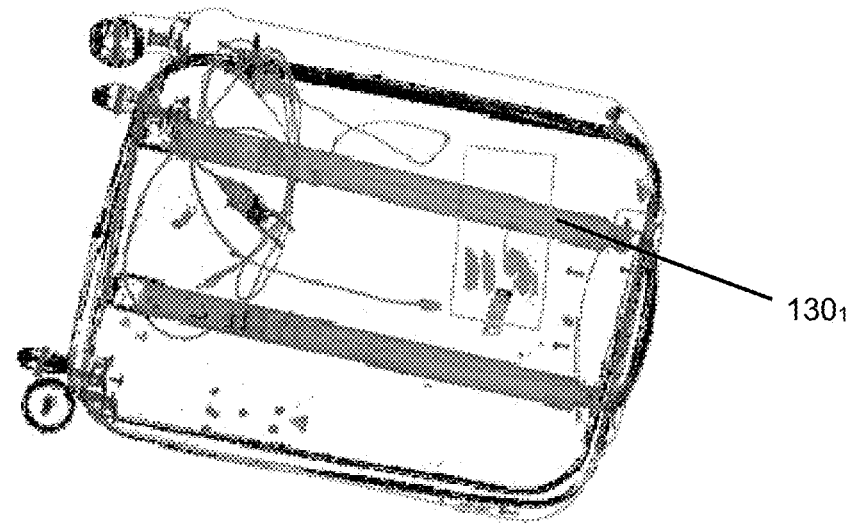
FIGS. 1B to 1D illustrate non-limitative examples of items, each including a concealing element enabling concealment of a prohibited object.
Figure 1C:
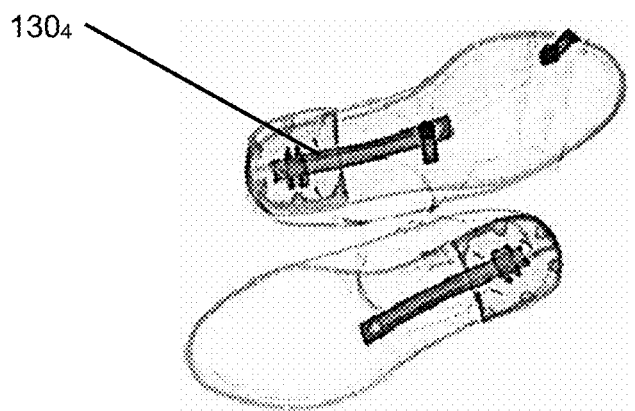
Figure 1D:
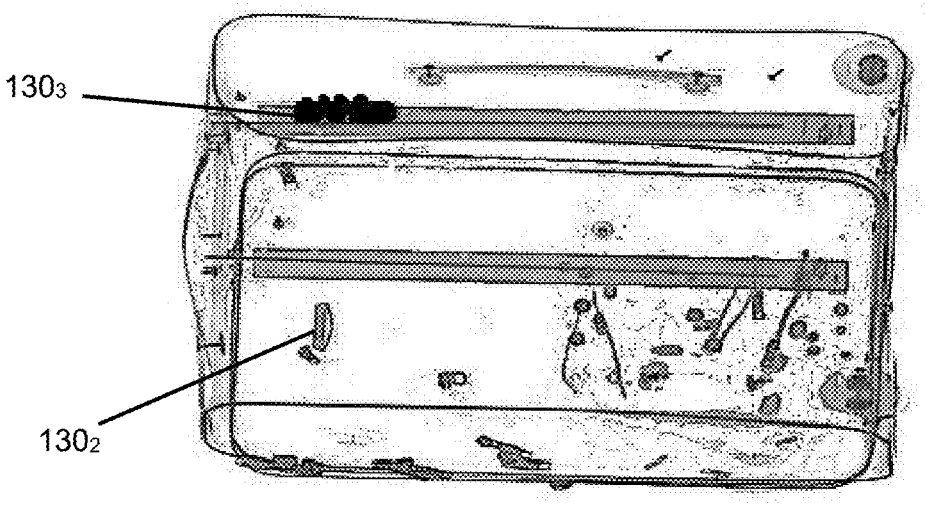

Non-limitative examples of concealing elements include:

baggage metallic tubes $130_1$ (see FIG. 1B);

bag icon $130_2$ (see FIG. 1D);

combination lock $130_3$ (see FIG. 1D);

reinforcement strips $130_4$ (or reinforcement sheets) of shoes (see FIG. 1C).

Figure 1E:
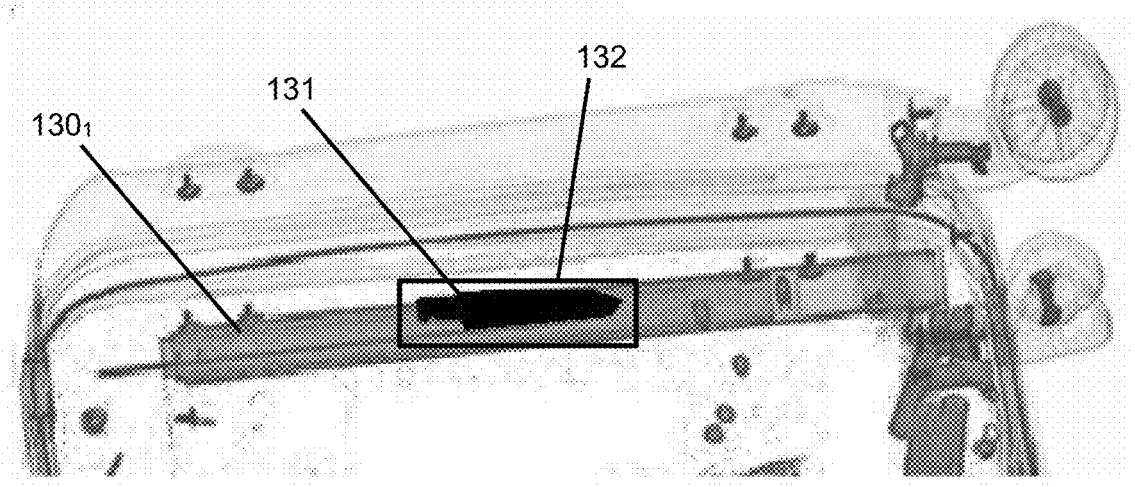
FIG. 1E illustrates a non-limitative example of an item in which a prohibited object is concealed using a concealing element in a baggage.

FIG. 1E illustrates an example in which a knife 131 is concealed using a baggage metallic tube $130_1$. As a consequence, visibility of the knife 131 in the image is reduced.

Attention is now drawn to FIG. 2.

Assume that an image of an item is obtained (operation 200). As mentioned above, the image can be acquired by an acquisition device 101.

The method includes performing (operation 210) a first detection in the image, to detect at least one given area of the image comprising at least part of (or all of) a given element of the item enabling concealment of a prohibited object using said given element (e.g. by concealing the prohibited object using the given element).

In some embodiments, operation 210 can include detecting in the image a plurality of given areas. Each given area of the area comprises at least part of a given element of the item, enabling concealment of a prohibited object using said given element.

According to some embodiments, the first detection can be performed using the first software module 112, which, as mentioned above, implements at least one (trained) first deep neural network.

Figure 2A:
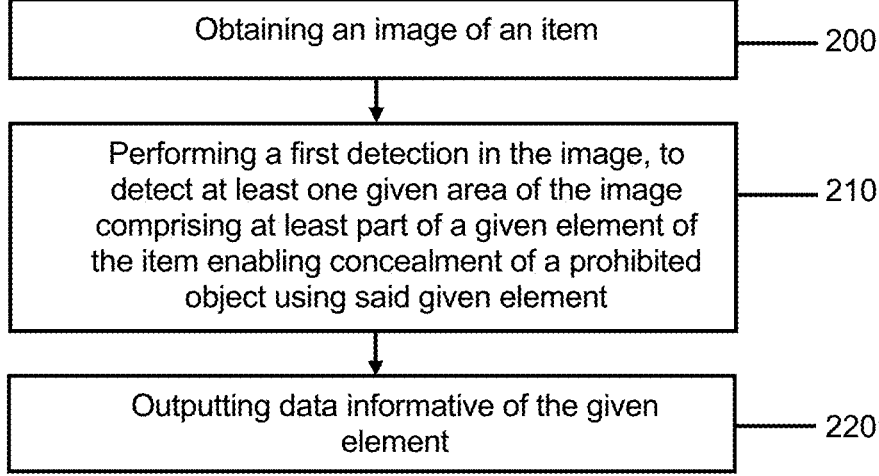
FIG. 2A illustrates a flow chart of an embodiment of a method of detecting concealing elements of an item in an image.
Figure 2B:
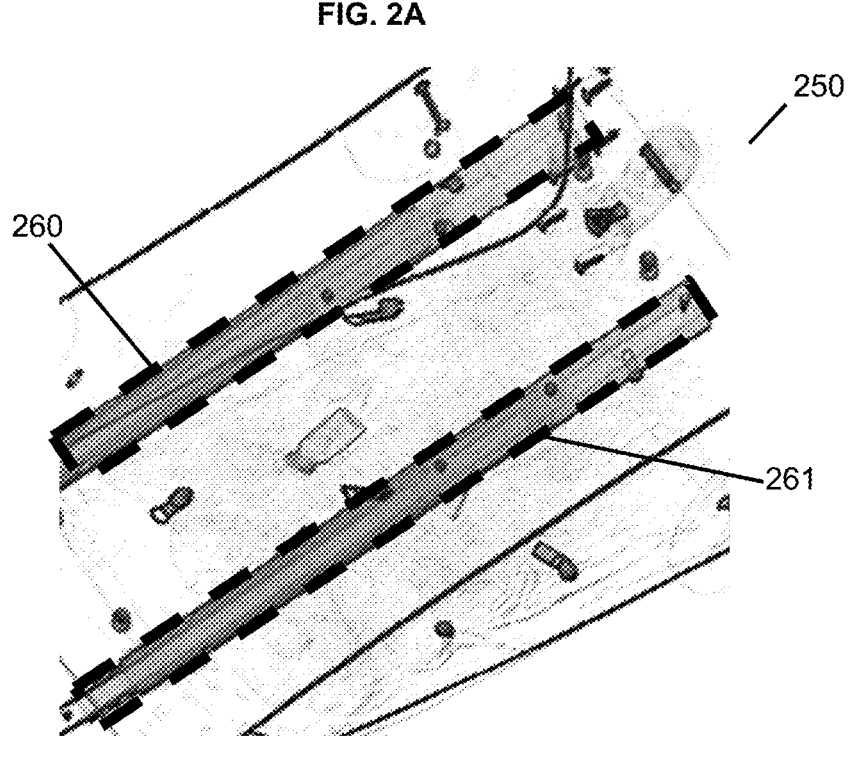
FIG. 2B illustrates a non-limitative example of data which can be obtained using the method of FIG. 2A.
Figure 2C:
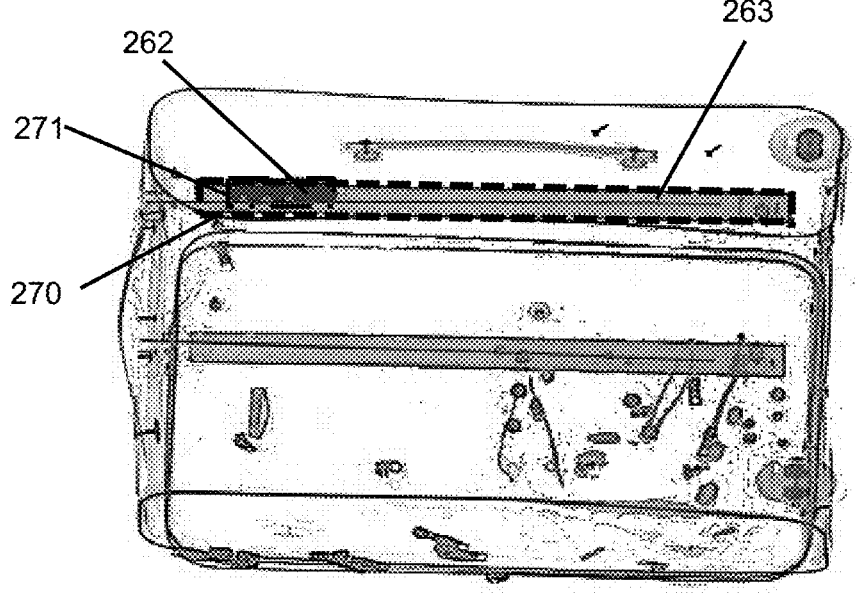
FIG. 2C illustrates another non-limitative example of data which can be obtained using the method of FIG. 2A.

FIG. 2B depicts an example of the output of FIG. 2A. An image 250 of a baggage is fed to the first deep neural network which identifies two different given areas 260 and 261 of the image 250. Area 260 corresponds to a first baggage metallic tube of the baggage and area 261 corresponds to a second baggage metallic tube of the baggage.

In some embodiments, there can be an overlap in the image between a first concealing element of the item and a second concealing element of the item (different from the first one). For example, in FIG. 2C, the combination lock 262 and the baggage metallic tube 263 overlap in the image. In some embodiments, the first deep neural network is trained to differentiate between two (or more) different concealing elements, even if they overlap in the image. In the example of FIG. 2B, this means that the first deep neural network identifies a first area 270 corresponding to the baggage metallic tube 263 in the image and a second area 271 corresponding to the combination lock 262 in the image. The second area 271 is located within the first area 270.

As shown in FIG. 2A, the first deep neural network outputs, at operation 220, data informative of the given element(s) identified in the image, which correspond to concealing element(s) of the item acquired in the image.

Data informative of the given element(s) can include a location/position of the given element(s) in the image. For example, position of a plurality of points of the contour of each given element(s) in the image can be provided. This is however not limitative.

Data informative of the given element(s) can include a type of the given element. The type can be defined according to predefined categories. Examples of predefined categories can include: baggage metallic tubes, bag icon, combination lock, reinforcement strips (or reinforcement sheets) of shoes, etc. Note that other categories can be defined.

According to some embodiments, data informative of the given element can include type of the given element (as explained above) and type of the item (e.g. bag, or piece of cloth, or shoes, etc.) in which the given element is located. This data can be determined e.g. by the trained first deep neural network.

Type of the item can be determined based on image processing of the whole image and/or based on a recognition of the given element itself. Generally, an object detection algorithm/neural network analyzes image of the given element and image of the background surrounding the element (e.g. a shoe, a baggage, etc.) to determine the type of the item.

Figure 3:
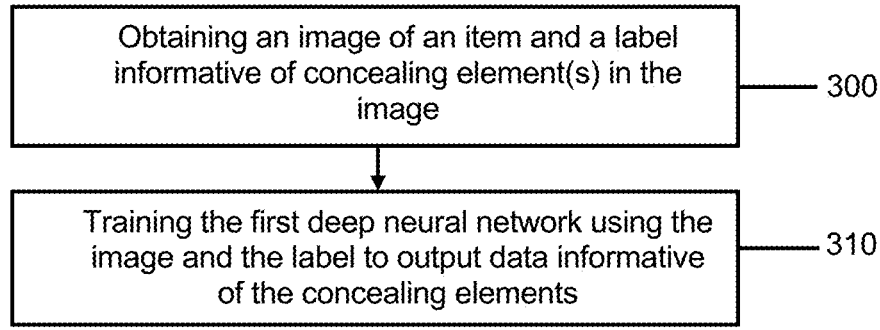
FIG. 3 illustrates a flow chart of an embodiment of a method of training a neural network to detect concealing elements of an item in an image.

FIG. 3 depicts a method of training the first deep neural network. In some embodiments, the training can include a supervised training, such as (but not limited to Backpropagation).

The method includes obtaining (300) a training set including a plurality of images. Each image includes an item (various examples of items have been provided above, and the images can include different items). Each image is associated with a label, which indicates a position of one or more concealing elements of the item present in the image and which are usable to conceal prohibited object(s). The position of each concealing element can be defined e.g. using the contour of the concealing element in the image. The label can be obtained based on an input of an operator who annotates the image.

In some embodiments, the label can include additional data, such as the type of the concealing element (see above examples of various possible definitions of types of concealing elements).

In some embodiments, the label can include data informative of the type of the item itself (e.g. baggage, piece of cloth, etc.).

The method includes training (operation 310) the first deep neural network using the training set.

As explained above, the first deep neural network is trained to detect each concealing element in the image, and, in particular, position of each concealing element in the image.

In some embodiments, the first deep neural network can be trained to further detect the type of each concealing element.

A set of types of concealing elements can be defined (e.g. by an operator— see above various examples of types of concealing elements) and the first deep neural network can be trained to select, for each concealing element, the type which corresponds to the concealing element. In some embodiments, the first deep neural network provides, for each type of the set of types, a probability that the concealing element is of this type. The type which has the highest probability can be selected.

In some embodiments, the first deep neural network can be trained to further detect the type of the item present in the image.

Once the first deep neural network is trained, it can be used in the method of FIG. 2A. In some embodiments, the first deep neural network can be retrained periodically, using e.g. the real images provided to the first deep neural network during operation, and the feedback of an operator (who can indicate whether the output of the first deep neural network is correct).

Attention is now drawn to FIG. 4A.

As explained with reference to FIG. 2A, a first detection is performed on the image of the item to detect the area(s) of the image including the concealing elements.

The method of FIG. 4A can use at least part of the output (see operation 400) of the method of FIG. 2A. In particular, the method of FIG. 4A includes performing a second detection using the second software module 113.

The second software module 113 includes at least one second neural network (e.g. DNN) which is trained to detect prohibited objects in an area including a concealing element of an item.

In some embodiments, each given area can be processed independently by the second software module. As explained hereinafter, in some embodiments, at least some of the given areas can be processed by different trained neural networks of the second software module.

For each given area which has been identified as including a concealing element by the method of FIG. 2A, the method of FIG. 4A includes detecting (operation 410) whether this given area includes a prohibited object.

In particular, according to some embodiments, the second detection is performed only in a fraction of the image, which includes the given area(s) identified by the method of FIG. 2A. In other words, the second detection focuses on the given areas(s) identified by the first detection, thereby facilitating detection of the prohibited object(s). Each second neural network (which is used in the second detection) therefore receives as an input a given area (as explained hereinafter, in some embodiments, each given area can be fed to a second neural network which is selected as being specifically trained for detecting a prohibited object concealed using a type of element present in this given area).

According to some embodiments, operation 410 includes using the given area of the image to detect presence of a prohibited object which is fully or at least partially concealed using the given element.

According to some embodiments, since each given area corresponds substantially to a concealing element (all or at least the vast majority of the given area corresponds to a concealing element), detecting whether each given area includes a prohibited object enables detecting whether a prohibited object is fully (or at least partially, or in its majority) concealed using the given area.

Operation 410 can include e.g. determining a prospect (e.g. probability) that a prohibited object is present. Based at least on this prospect, a decision whether a prohibited object is present in the image can be made. For example, if the prospect is above a threshold (or equal to the threshold), then a decision that a prohibited object is present is made, and if this is not the case, a decision that a prohibited object is not present can be made.

If it is detected that at least one given area (out of the plurality of given areas) includes a prohibited object, an action can be performed (operation 420). Typically, performing an action can include raising an alert. The alert can include e.g. a textual alert and/or visual alert and/or audio alert. The alert can be displayed e.g. on a screen, and/or transmitted to an electronic device (e.g. computer, smartphone) of one or more operators. In some embodiments, raising an alert can include sending a command to another system which can trigger the alert.

In some embodiments, performing an action can include associating, in a database, identity data of the item's owner with a malicious label.

In some embodiments, performing an action can include triggering a system to destroy or annihilate the item and/or the detected prohibited object.

In some embodiments, the action and/or alert can be different depending on the type of prohibited object. For example, for a prohibited object considered as highly dangerous (e.g. an assault rifle), a first type of alert can be raised, and for a prohibited object considered as less dangerous (e.g. scissors), a second type of alert can be raised, different from the first type.

In some embodiments, the action and/or alert can include instructing a conveyor (of the lane) to move the item to a separate area for manual inspection.

In some embodiments, the action and/or alert can include sending an instruction (e.g. to the acquisition device) to immediately stop the conveyor, while the item is still inside the tunnel. This can be used e.g. when a bomb (or another similar dangerous object) has been detected.

In some embodiments, the method can include outputting additional data informative of the prohibited object(s). This data can include location of the prohibited object in the image.

In some embodiments, the method can output a modified image in which location of the prohibited object is emphasized (using e.g. device 107), thereby facilitating manual inspection of the item by an operator. This is shown in FIG. 1E, in which a bounding box 132 is added on the image and indicates presence of a knife (concealed using the concealing element 130₁) identified during the second detection.

In some embodiments, data output by the method can include e.g. the size and/or shape and/or type (e.g. knife, rifle, etc.) of the prohibited object. This data can be provided by the second neural network, which can be trained to provide such data, as explained hereinafter.

Figure 4B:
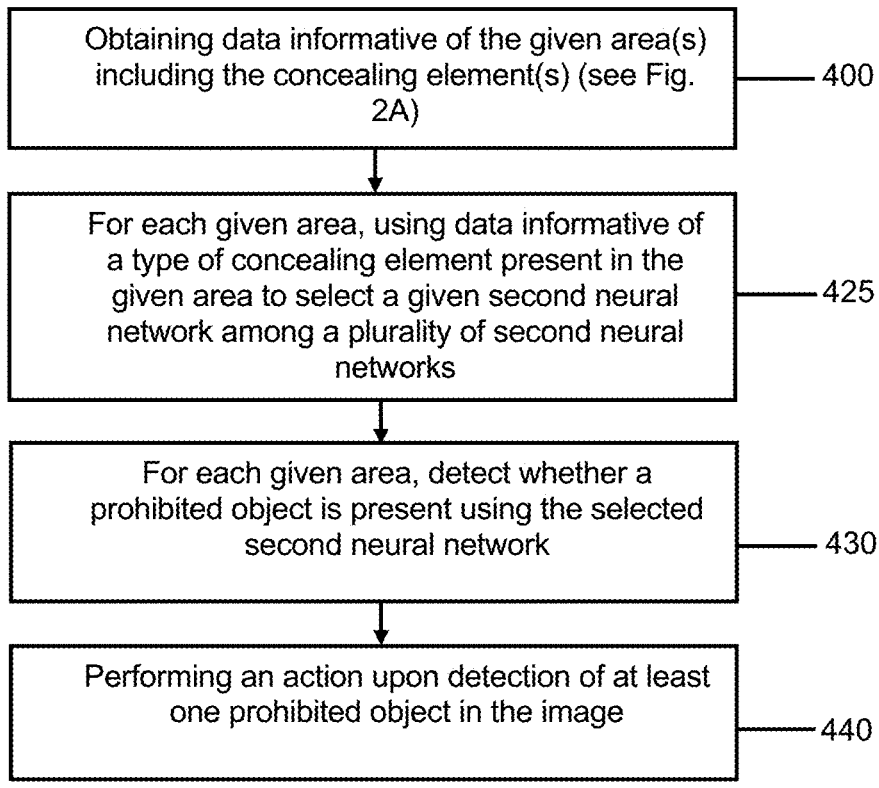
FIG. 4B illustrates a variant of the method of FIG. 4A.

Attention is now drawn to FIG. 4B.

The method of FIG. 4B includes obtaining data informative of the given area(s) including the concealing element(s) (operation 400, already described above with reference to FIG. 4A).

In this embodiment, the second software module implements a plurality of second neural networks $113_1$ to $113_N$ (e.g. deep neural networks).

Each second neural network $113_1$ to $113_N$ is trained to detect presence of a prohibited object in an image in which the prohibited object is (fully or at least partially, or in its majority) concealed using a concealing element of an item.

According to some embodiments, each second neural network of the plurality of second neural networks is trained to detect a prohibited object in an image which includes a different type of concealing element.

More particularly, for at least a subset of the plurality of second neural networks, or for all of them, each second neural network of the plurality of second neural networks is trained to detect in an image a prohibited object concealed (fully or at least partially or in its majority) using a concealing element of a different type.

For example, second neural network $113_1$ is trained to detect prohibited object(s) concealed using a first type of concealing element, second neural network $113_2$ is trained to detect prohibited object(s) concealed using a second type of concealing element (different from the first type), etc.

It can occur than some of the second neural networks of the plurality of neural networks are trained to detect prohibited object(s) concealed using the same type of concealing element (for example two second neural networks are organized according to a different architecture but are trained to detect prohibited objects concealed using the same type of concealing element).

The different types of concealing elements can be defined according to various rules.

The type can be defined according to predefined categories. Examples of predefined categories can include: baggage metallic tubes, bag icon, combination lock, reinforcement strips (or reinforcement sheets) of shoes, etc. In some embodiments, the categories can be split into a number of sub-categories, in order to further improve accuracy. For example, baggage metallic tubes comprise a first subcategory of baggage metallic tubes of small size baggage, a second subcategory of baggage metallic tubes of intermediate size baggage, and a third subcategory of baggage metallic tubes of large size baggage. This is however not limitative. Other categories/subcategories can be defined, depending on the needs.

According to some embodiments, the type of concealing element can be defined with reference to the type of the item. For example, a first type corresponds to a reinforcement strip of shoes and a second type corresponds to a reinforcement strip of a bag.

According to some embodiments, the type of concealing element can be defined with reference to the material of the concealing element. For example, if the X-ray image is a colored image, a table linking color in the image to the atomic number of the material can be used to automatically detect type of concealing element in the image. Note that in case a neural network is used for object detection, the color of the image is automatically taken into account to detect the type of concealing element.

As mentioned above with reference to FIG. 2A, data informative of the type of the concealing element present in each area can be determined by the first software module.

The method of FIG. 4B includes, for each given area of the image identified as including a concealing element, using data informative of the type of concealing element to select a given second neural network among the plurality of different second neural networks. Assume that a given area includes a concealing element of a given type. Operation 425 can include selecting the given second neural network which has been specifically trained to detect a prohibited object in an area of an image including a concealing element of this given type.

For example, assume that it has been determined that a given area of the image includes a baggage metallic tube. Assume that the second software module implements at least one second neural network which has been trained to detect prohibited objects concealed using this type of concealing element (baggage metallic tube). As a consequence, this second neural network is selected to perform the second detection, and to verify whether a prohibited object is present in this given area.

The method further includes (operation 430), for each given area, detecting whether a prohibited object is present in the given area using the second neural network selected for this given area. Since the given area corresponds substantially to the given concealing element, operation 430 enables detecting a prohibited object which is fully (or at least partially, or in its majority) concealed using the given concealing element.

If a plurality of different areas has been identified in the image, and each area includes a different type of concealing element, then a different second neural network is selected and used to perform the second detection in each area.

Upon detection of presence of a prohibited object in the image, an action can be performed (operation 440, which is similar to operation 420 already described above).

Attention is now drawn to FIG. 4C.

The method of FIG. 4C includes detecting (operation 450) whether a prohibited object is present based on an analysis of the whole image (or a majority of the image), thereby obtaining a first output (e.g. a score/prospect/probability) informative of the presence of a prohibited object. For example, a deep neural network can be trained to detect presence of a prohibited object in an image of an item, using e.g. supervised learning (a training set of images including prohibited objects and images which do not include prohibited objects can be used). In some embodiments, for each type of item (e.g. baggage, shoes, etc.), a different deep neural network can be trained and used in the method of FIG. 4C.

In operation 450, the image is processed as a whole.

The method of FIG. 4C further includes detecting (operation 460) presence of given areas corresponding to concealing elements of the item. Operation 460 can be performed using the method of FIG. 2A.

The method of FIG. 4C further includes determining whether a prohibited object is present in each given area (as mentioned above, this includes detecting presence of a prohibited object fully or at least partially concealed using a concealing element present in the given area). Operation 460 can be performed using e.g. the method of FIG. 4A or FIG. 4B. Operation 460 enables to obtain a second output (e.g. a score/prospect/probability) informative of the presence of a prohibited object.

The method of FIG. 4C further includes performing the action upon detection of the presence of a prohibited object in the image, wherein the detection is based at least on the first output and the second output.

In other words, the detection depicted in FIG. 4C is based both on a global approach (in which the whole image is processed), and an approach which focuses on the concealing elements.

Assume that the first output provides a first probability that a prohibited object is present and that the second output provides a second probability that a prohibited object is present. An aggregated probability can be computed and compared to a threshold. In some embodiments, a weight can be assigned to the second probability which is higher than a weight assigned to first probability, since the second probability is more accurate.

If the aggregated probability is above or equal to the threshold, this indicates that a prohibited object is present. If not, this indicates that the prohibited object is not present.

In some embodiments, operation 450 provides, for one or more first locations in the image, a probability that a prohibited object is present.

Similarity, operation 470 provides, for one or more second locations in the image, a probability that a prohibited object is present.

For each location of the image, a probability that a prohibited object is present can be computed based on the output of operation 450 and/or on the output of operation 470. If for at least one location the computed probability is equal to or above a threshold, an action can be performed (operation 480), as already explained with reference to FIG. 4A.

Attention is now drawn to FIG. 5.

As mentioned above, according to some embodiments, each given second neural network ($113_1$ to $113_N$) is trained to detect a prohibited object partially or fully concealed using a concealing element of a given type.

FIG. 5A depicts a non-limitative method of training a given second neural network for detection with respect to a given type of concealing element.

Figure 5B:
FIGS. 5B and 5C illustrate images that can be used in the training method of FIG. 5A.
Figure 5C:
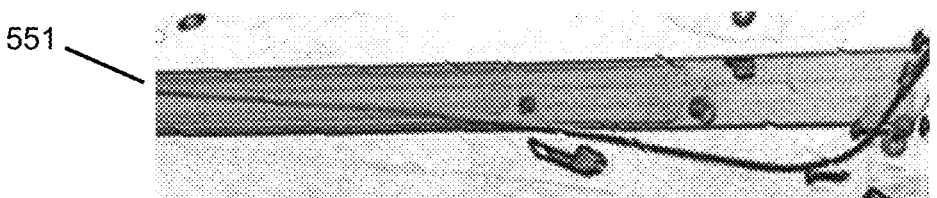

The method includes (operation 500) obtaining a training set. The training set includes:

a plurality of first images, each first image including a concealing element of the given type, and a prohibited object fully (or at least partially, or in its majority) concealed using the concealing element of the given type (see e.g. image 550 in FIG. 5B, in which a knife $550_1$ is fully concealed using baggage metallic tube $550_2$);

a plurality of second images, wherein each second image includes a concealing element of the given type but does not include a prohibited object (see e.g. image 551 in FIG. 5C, in which no prohibited object is present under or above or within the baggage metallic tube $550_3$).

At least some of the images of the training set can be real images and/or real images in which a prohibited object has been artificially added and/or simulated images and/or synthetic images.

According to some embodiments, the first images include different types of prohibited objects, in order to train the second neural network to detect various types of prohibited objects.

According to some embodiments, the training set includes images depicting a given type of concealing element used in different types of items.

Each image of the training set is labelled (e.g. by an operator). The label indicates e.g. whether the image includes a prohibited object. In some embodiments, the label can include further data such as the type of prohibited object, its location, the type of concealing element, etc.

According to some embodiments, each image of the training set focuses on the concealing element, meaning that all, or at least the majority of the image, includes the concealing element.

The method of FIG. 5A further includes using the training set to train a given second neural network of the plurality of second neural networks $113_1$ to $113_N$. Training can use methods such as Backpropagation (this is however not limitative). The given second neural network is therefore trained specifically for detecting, in an image, prohibited objects concealed using a concealing element of the given type.

In some embodiments, each second neural network is trained to output a probability that a prohibited object is present.

The method of FIG. 5A can be repeated for each second neural network of the plurality of second neural networks $113_1$ to $113_N$. A different training set can be used for each second neural network. In particular, each training set can be dedicated to a different type of concealing element. As a consequence, each second neural network is trained to detect a prohibited object concealed using a different type of concealing element.

Figure 6:
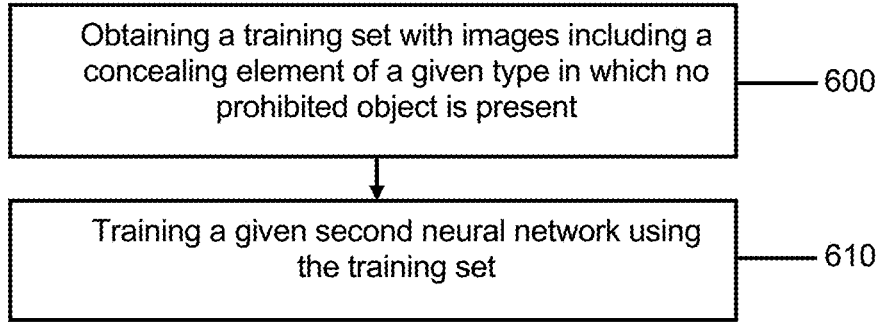
FIG. 6 illustrates a flow chart of another embodiment of a method of training a neural network to detect a prohibited object in an image of a concealing element of an item.

Attention is drawn to FIG. 6.

The method includes (operation 600) obtaining a training set. The training set includes a plurality of images. Each image of the training set (or at least most of them) includes a concealing element of a given type which does not include a prohibited object (see e.g. image 551 in FIG. 5C). The images can be selected such that they include different types of concealing elements.

At least some of the images of the training set can be real images and/or simulated images and/or synthetic images.

According to some embodiments, the images include different types of prohibited objects, in order to train the second neural network to detect various types of prohibited objects.

According to some embodiments, the training set includes a given type of concealing element, but for different types of items.

According to some embodiments, each image of the training set focuses on the concealing element, meaning that all, or at least the majority of the image, includes the concealing element.

In this method, it is not required to label the images.

According to some embodiments, each image of the training set focuses on the concealing element, meaning that all, or at least the majority of the image, includes the concealing element.

The method of FIG. 6 further includes training (operation 610) a given second neural network of the plurality of second neural networks $113_1$ to $113_N$, using the training set obtained at operation 600.

Training can be performed using anomaly detection methods. This is however not limitative.

The method of FIG. 6 is particularly beneficial when the second neural network is an Auto-Encoder, or a Generative Adversarial Network (the GAN can be combined with a discriminator). This is however not limitative, and other deep neural networks can be used.

The given second neural network is therefore trained specifically for detecting, in an image, prohibited objects concealed using a concealing element of the given type. The given second neural network is trained to detect anomalies Indeed, since it has been trained on images which are free of prohibited objects, if, during the prediction stage, it encounters an image with a prohibited object, it is able to provide a score informative of the probability of a presence of a prohibited object (presence of the prohibited object is viewed as an anomaly by the second neural network). Since a large training set of data is used (which covers various scenarios including unprohibited objects), this generally prevents from raising an alarm when an unprohibited object is concealed using the concealing element.

The method of FIG. 6 can be repeated for each second neural network of the plurality of second neural networks $113_1$ to $113_N$. A different training set can be used for each second neural network. In particular, each training set can be dedicated to a different type of concealing element.

As can be understood from the methods described above, training each given second neural network to specifically detect prohibited objects concealed using a given type of concealing element can be obtained using a training set in which all, or at least a majority of the images of the training set, includes the concealing element of the given type. In the method of FIG. 5A, both positive examples (with a prohibited object) and negative examples (without a prohibited object) are used in the training set, and in the method of FIG. 6 most or all of the examples of the training set are negative examples.

It is to be noted that the various features described in the various embodiments may be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A system comprising one or more processing circuitries configured to:

obtain an image of an item acquired by an acquisition device, perform a first detection using at least one first deep neural network, to detect at least one given area of the image comprising at least part of a given unprohibited concealing element of the item which enables concealment of a prohibited object, wherein the first detection is not directed to identifying prohibited objects or materials corresponding to prohibited objects, determine that the given unprohibited concealing element belongs to a named category of unprohibited concealing elements associated with certain physical characteristic comprising at least one of material or shape, wherein a primary purpose of the given unprohibited concealing element comprises at least one of mechanical support, reinforcement, fastening, or identification, use the named category of the given unprohibited concealing element to select a given second neural network among a plurality of different second neural networks operative to detect prohibited objects concealed using concealing elements, wherein the given second neural network has been trained to detect in an image presence of a prohibited object concealed using a concealing element of said named category, perform a second detection comprising using the given second neural network to detect whether the given area comprises a prohibited object, and perform an action in response to detection of a presence of a prohibited object in the image.

2. The system of claim 1, wherein performing the second detection comprises detecting in the given area a prohibited object which is fully or at least partially concealed using the given unprohibited concealing element.

3. The system of claim 1, wherein performing the action includes triggering an alert.

4. The system of claim 1, configured to perform the second detection only on a fraction of the image including the given area.

5. The system of claim 1, configured to use the first deep neural network to determine the named category of the given unprohibited concealing element present in the given area.

6. The system of claim 1, wherein, for at least a subset of the plurality of different second neural networks, each given second neural network of the subset is trained to detect a prohibited object in an image comprising a different category of element enabling concealment of the prohibited object.

7. The system of claim 6, wherein each second neural network of the plurality of different second neural networks has been trained using a training set comprising:

images in which a prohibited object is concealed using an element of an item, the element being of a category for which the second neural network is trained, and images in which no prohibited object is present.

8. The system of claim 6, wherein each second neural network of the plurality of different second neural networks has been trained using a training set comprising only images in which no prohibited object is present.

9. The system of claim 1, wherein the plurality of different second neural networks comprises:

a second neural network trained to detect in an image a prohibited object fully or at least partially concealed using an element of a first category;

another second neural network trained to detect in an image a prohibited object fully or at least partially concealed using an element of a second category, wherein the second category type is different from the first category.

10. The system of claim 1, wherein:

for at least a subset of the plurality of different second neural networks, each second neural network of the subset is trained to detect in an image presence of a prohibited object concealed using an element of a different category, and the system is configured to select the given second neural network which is trained to detect in an image presence of a prohibited object concealed using an element of said named category.

11. The system of claim 1, configured to:

perform a detection in a majority of the image to detect whether a prohibited object is present in the image, thereby obtaining a first output informative of a presence of the prohibited object in the image, perform the first detection and the second detection, thereby obtaining a second output informative of a presence of a prohibited object in the image, perform an action in response to detection of a presence of a prohibited object in the image, wherein said detection is based at least on the first output and the second output.

12. The system of claim 1, wherein the given unprohibited concealing element comprises at least one of: baggage tube, baggage metallic tube, bag icon, combination lock, reinforcement element or metallic concealing element.

13. A method comprising, by one or more processing circuitries:

obtaining an image of an item acquired by an acquisition device, performing a first detection using at least one first deep neural network, to detect at least one given area of the image comprising at least part of a given unprohibited concealing element of the item which enables concealment of a prohibited object, wherein the first detection is not directed to identifying prohibited objects or materials corresponding to prohibited objects, determining that the given unprohibited concealing element belongs to a named category of unprohibited concealing elements associated with certain physical characteristic comprising at least one of material or shape wherein a primary purpose of the given unprohibited concealing element comprises at least one of mechanical reinforcement, fastening or identification, using the named category of the given unprohibited concealing element to select a given second neural network among a plurality of different second neural networks operative to detect prohibited objects concealed using concealing elements, wherein the given second neural network has been trained to detect in an image presence of a prohibited object concealed using a concealing element of said named category, performing a second detection comprising using the given second neural network to detect whether the given area comprises a prohibited object, and performing an action in response to detection of a presence of a prohibited object in the image.

14. The method of claim 13, comprising performing at least one of (i) or (ii) or (iii) or (iv):

(i) performing the second detection comprises detecting in the given area a prohibited object which is fully or at least partially concealed using the given unprohibited concealing element, or (ii) performing the second detection only on a fraction of the image including the given area, or (iii) determining the named category of the given unprohibited concealing element is performed using the at least one first deep neural network, or (iv) using the given second neural network to detect in the given area a prohibited object which is fully or at least partially concealed using the given unprohibited concealing element.

15. The method of claim 13, wherein at least one of (i) or (ii) is met:

(i) for at least a subset of the plurality of different second neural networks, each given second neural network of the subset is trained to detect a prohibited object in an image comprising a different category of element enabling concealment of the prohibited object, or (ii) the plurality of different second neural networks comprises:

a second neural network trained to detect in an image a prohibited object fully or at least partially concealed using an element of a first category;

another second neural network trained to detect in an image a prohibited object fully or at least partially concealed using an element of a second category, wherein the second category is different from the first category.

16. The method of claim 13, wherein at least one of (i) or (ii) is met:

(i) each second neural network of the plurality of different second neural networks has been trained using a training set comprising:

images in which a prohibited object is concealed using an element of an item, the element being of a category for which the given second neural network is trained, and images in which no prohibited object is present, or (ii) each second neural network of the plurality of different second neural networks has been trained using a training set comprising only images in which no prohibited object is present.

17. The method of claim 13, comprising:

for at least a subset of a plurality of different second neural networks, each second neural network is trained to detect in an image presence of a prohibited object concealed using an element of a different category, wherein the method comprises selecting the given second neural network which is trained to detect in an image presence of a prohibited object concealed using an element of said named category.

18. The method of claim 13, comprising:

performing detection in a majority of the image to detect whether a prohibited object is present in the image, thereby obtaining a first output informative of a presence of the prohibited object in the image, performing the first detection and the second detection, thereby obtaining a second output informative of a presence of a prohibited object in the image, and performing an action in response to detection of a presence of a prohibited object in the image.

19. The method of claim 13, wherein the given unprohibited concealing element comprises at least one of: baggage tube, baggage metallic tube, bag icon, combination lock, reinforcement element or metallic concealing element.

20. A non-transitory storage device readable by one or more processors, tangibly embodying a program of instructions executable by the one or more processors to perform:

obtaining an image of an item acquired by an acquisition device, performing a first detection using at least one first deep neural network, to detect at least one given area of the image comprising at least part of a given unprohibited concealing element of the item which enables concealment of a prohibited object, wherein the first detection is not directed to identifying prohibited objects or materials corresponding to prohibited objects, determining that the given unprohibited concealing element belongs to a named category of unprohibited concealing elements associated with certain physical characteristic comprising at least one of material or shape, wherein a primary purpose of the given unprohibited concealing element comprises at least one of mechanical support, reinforcement, fastening, or identification;

using the named category of the given unprohibited concealing element to select a given second neural network among a plurality of different second neural networks operative to detect prohibited objects concealed using concealing elements, wherein the given second neural network has been trained to detect in an image presence of a prohibited object concealed using a concealing element of said named category, performing a second detection comprising using the given second neural network to detect whether the given area comprises a prohibited object, and performing an action in response to detection of a presence of a prohibited object in the image.

* * * * *